US007506254B2

(12) United States Patent  
Franz

(10) Patent No.: US 7,506,254 B2
(45) Date of Patent: Mar. 17, 2009

(54) PREDICTIVE CONVERSION OF USER INPUT

(75) Inventor: Alexander M. Franz, Palo Alto, CA (US)

(73) Assignee: Google Inc., Mountain View, CA (US)

(*) Notice: Subject to any disclaimer, the term of this patent is extended or adjusted under 35 U.S.C. 154(b) by 653 days.

(21) Appl. No.: 11/111,583

(22) Filed: Apr. 21, 2005

(65) Prior Publication Data

US 2006/0241933 A1    Oct. 26, 2006

(51) Int. Cl.
G06F 17/21   (2006.01)
G06F 17/22   (2006.01)

(52) U.S. Cl. .................. 715/259; 715/260; 715/264; 715/265; 715/271

(58) Field of Classification Search .......... 715/259, 715/260, 264, 265, 271, 816; 704/1, 2, 3, 704/5, 8, 10
See application file for complete search history.

(56) References Cited

U.S. PATENT DOCUMENTS

| 5,953,541 | A | 9/1999 | King et al. |
| 6,356,866 | B1* | 3/2002 | Pratley et al. ............... 704/9 |
| 6,377,965 | B1 | 4/2002 | Hachamovitch et al. |
| 6,564,213 | B1 | 5/2003 | Ortega et al. |
| 6,668,085 | B1* | 12/2003 | Evans ....................... 382/229 |
| 7,165,019 | B1* | 1/2007 | Lee et al. ...................... 704/2 |
| 7,395,203 | B2* | 7/2008 | Wu et al. ................... 704/235 |
| 2002/0193984 | A1* | 12/2002 | Sugano ......................... 704/2 |
| 2003/0233615 | A1* | 12/2003 | Morimoto et al. ......... 715/501.1 |
| 2004/0139397 | A1* | 7/2004 | Yuan et al. .................. 715/517 |
| 2004/0153306 | A1* | 8/2004 | Tanner et al. ................... 704/4 |
| 2005/0131686 | A1* | 6/2005 | Yamamoto et al. .......... 704/231 |
| 2005/0240393 | A1* | 10/2005 | Glosson ......................... 704/8 |
| 2006/0106769 | A1* | 5/2006 | Gibbs ............................ 707/3 |

FOREIGN PATENT DOCUMENTS

| EP | 1 359 516 A2 | 11/2003 |
| JP | 2001005807 A * | 1/2001 |
| WO | WO 2006/055120 A2 | 5/2006 |

OTHER PUBLICATIONS

"Method of Modeless Word Completion", IBM Technical Disclosure Bulletin, Feb. 1996, 155-156, 39-02, IBM Corp., Armonk, NY, US.

* cited by examiner

Primary Examiner—Rachna S Desai
Assistant Examiner—Chau Nguyen
(74) Attorney, Agent, or Firm—Fish & Richardson P.C.

(57) ABSTRACT

Systems and methods for predictive conversion of user text input in one language or character set to another language or character set are disclosed. The method may generally include converting a partial user input in a non-target language or character set to a converted partial user input in a target language or character set and computing likely possible converted completions of the converted partial user input based on a likely completions module. The converting may be based on a dictionary of non-target language or character set to target language or character set mappings. The likely completions module may be a database or a model trained by performing statistical analysis on a database of user inputs or a subset thereof. The subset of user inputs may be selected from those from a particular geographic location or time period and/or from the user or the user's current session.

12 Claims, 5 Drawing Sheets

PREDICTIVE CONVERSION OF USER INPUT

BACKGROUND OF THE INVENTION

1. Field of the Invention

The present invention relates generally to conversion of user text input in one language or character set to another language or character set. More specifically, systems and methods for predictive conversion of user text input in one language or character set to another language or character set are disclosed.

2. Description of Related Art

It may be difficult or impossible for a user to enter text directly into a computer system using non-target language input devices such as keyboards. For example, it may be difficult for the user to enter text directly in non-Roman based languages such as Chinese, Japanese, and Korean (CJK) using a conventional keyboard with Roman or alphabetic characters. Instead, a separate conversion step is generally required in which a conversion engine converts the user's alphabetic string input to the target language. As an example, one common method for inputting Chinese language text uses phonetic input, e.g., pinyin. Pinyin uses alphabetic characters and has a vocabulary listed in the form of multiple syllable words. A pinyin converter then converts the text written in pinyin to Chinese. For example, the user may enter a phonetic representation in pinyin of the desired Chinese text input using the roman letters on a keyboard. A pinyin conversion engine can then convert the pinyin input to Chinese text. The appropriate Chinese text can then be entered into an application, e.g., a word processing application and/or search engine.

As another example, Japanese text can be expressed using a variety of different character sets, including hiragana, katakana, and kanji, none of which are easily entered using a typical ASCII keyboard based on the Roman alphabet. One method for inputting Japanese language text uses romaji, a phonetic, Roman-alphabet representation of Japanese. For example, the user can use a word processor such as Ichitaro, from JustSystem Corp. of Tokushima City, Japan, to convert romaji text input to katakana, hiragana, and/or kanji. The Japanese text can then be entered into an application, e.g., a word processing application and/or search engine. Another example of a commercially available conversion engine or program is Input Method Editors by Microsoft for various languages.

However, conversion programs generally require the user to enter the complete representation of the text input. In addition, such conversions programs are tedious for the user because there is often no one-to-one conversion between the phonetic Roman representation on the one hand and text in the native or target language on the other hand. Instead, most Roman representation input entered by the user is ambiguous. In other words, for most Roman representation user inputs, there is more than one native language conversion that can be made by the conversion program. The conversion program thus may list multiple possible conversions, e.g., in order of probability, in a separate window or a drop-down list. The conversion engine and/or the user can then select the best or correct conversion. As is evident, such an input method can often be tedious and time consuming for the user due at least in part to the ambiguous Roman representation user input.

What is needed is a more efficient and user friendly method for entering input text using a non-target input language or character set and for converting the user input to a target language or character set.

SUMMARY OF THE INVENTION

Systems and methods for predictive conversion of user text input in one language or character set to another language or character set are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method may generally include converting a partial user input in a non-target language or character set to a converted partial user input in a target language or character set, computing likely possible converted completions of the converted partial user input based on a likely completions module, the possible completion being in the target language or character set, and outputting one or more possible likely possible converted completions. The converting may be based on a dictionary of non-target language or character set to target language or character set mappings. The likely completions module may be a database of user inputs or a subset thereof or may be a model trained by performing statistical analysis on a database of user inputs or a subset thereof. The subset of user inputs may be selected from those from a predetermined geographic location or time period and/or from the user or the current session. The method may also include selecting the likely completions module from multiple likely completions modules.

In another embodiment, a predictive conversion system generally includes a predictive conversion engine configured to generate a converted partial user input in a target language or character set from a partial user input in a non-target language or character set and to compute likely possible completions of the converted partial user input in the target language or character set based on a likely completions module and a dictionary of non-target language or character set to target language or character set mappings. The dictionary facilitates the predictive conversion engine in converting the partial user input in the non-target language or character set to the converted partial user input in the target language or character set.

In yet another embodiment, a computer program product for use in conjunction with a computer system includes a computer readable storage medium on which are stored instructions executable on a computer processor, the instructions generally including receiving the partial user input, the partial user input being in a non-target language or character set, converting the partial user input to a target language or character set to generate a converted partial user input, computing at least one likely possible completion of the converted partial user input based on a likely completions module, the possible completion being in the target language or character set, outputting at least one possible likely possible converted completion.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
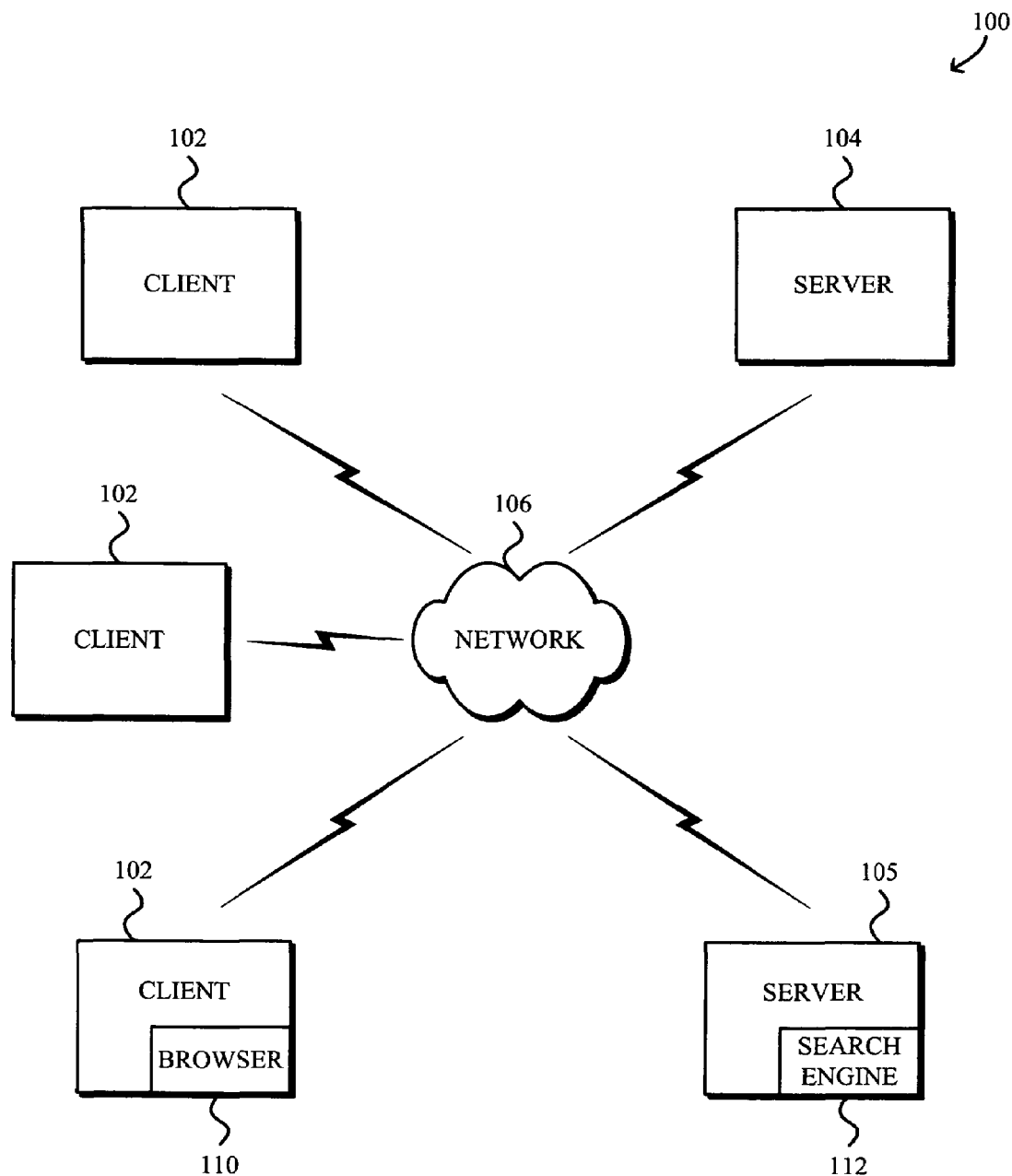
FIG. 1 is a block diagram of an illustrative information retrieval system in which a predictive user input conversion system may be implemented.

Systems and methods for predictive conversion of user text input in one language or character set to another language or character set are disclosed. Predictive conversion generally refers to both a predictive completion of the user text input and conversion from an input non-target language or character set to a target language or character set. For example, a user input A in an input non-target language or character set may be converted to X in the target language or character set and predictively completed to XYZ. Alternatively, a user input A in an input non-target language or character set may be predictively completed to ABC and converted to XYZ in the target language or character set. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The systems and methods for predictive conversions of user entries in one language or form to another language or form facilitate users in entering text into a computer system using non-target language input methods or devices such as keyboards. For example, the predictive user entry conversion systems and methods may be adapted to facilitate users in entering text in non-Roman based languages such as Chinese, Japanese, and Korean (CJK) using conventional keyboards with Roman or alphabetic characters. The user may enter a partial input, e.g., a partial representation of a word or character, in a first language or character set, e.g., a phonetic input such as pinyin or romaji, which the predictive user entry conversion system may predictively convert to the target language or character set, e.g., Chinese characters or katakana, hiragana, and/or kanji, and present one or more predictive suggested conversions to the user. As described in the illustrative examples presented herein, the predictive conversion systems and methods may be implemented in an information retrieval system or search engine to predictively convert the user's alphabetic string search input to the target language. The predictively converted user input may then be used, for example, to perform a search for relevant documents. However, it is to be understood that the predictive conversion systems and methods may be implemented in various other suitable applications such as a word processing application or other applications requiring text entry.

FIG. 1 is a block diagram of an illustrative information retrieval system 100 in which a predictive user input conversion system may be may be implemented. The system 100 may include multiple client devices 102 connected to multiple servers 104, 105 via a network 106. The client devices 102 may include a browser 110 for accepting user input, and for displaying information that has been received from other systems 102, 104, 105 over the network 106. The servers 104, 105 may include a search engine 112 for accepting user queries transmitted over the network 106, searching a database of documents, and returning results to the user. The network 106 may comprise a local area network (LAN), a wide area network (WAN), a virtual private network (VPN), a telephone network, such as the Public Switched Telephone Network (PSTN), an intranet, the Internet, or a combination of networks. Merely for illustration, the information retrieval system 100 shown in FIG. 1 includes three client devices 102 and two servers 104, 105 connected via the network 106. However, it will be appreciated that in practice there may be more or fewer client devices, servers, and/or networks, and that some client devices may also perform at least some functions of a server and some servers may also perform at least some functions of a client.

Figure 2:
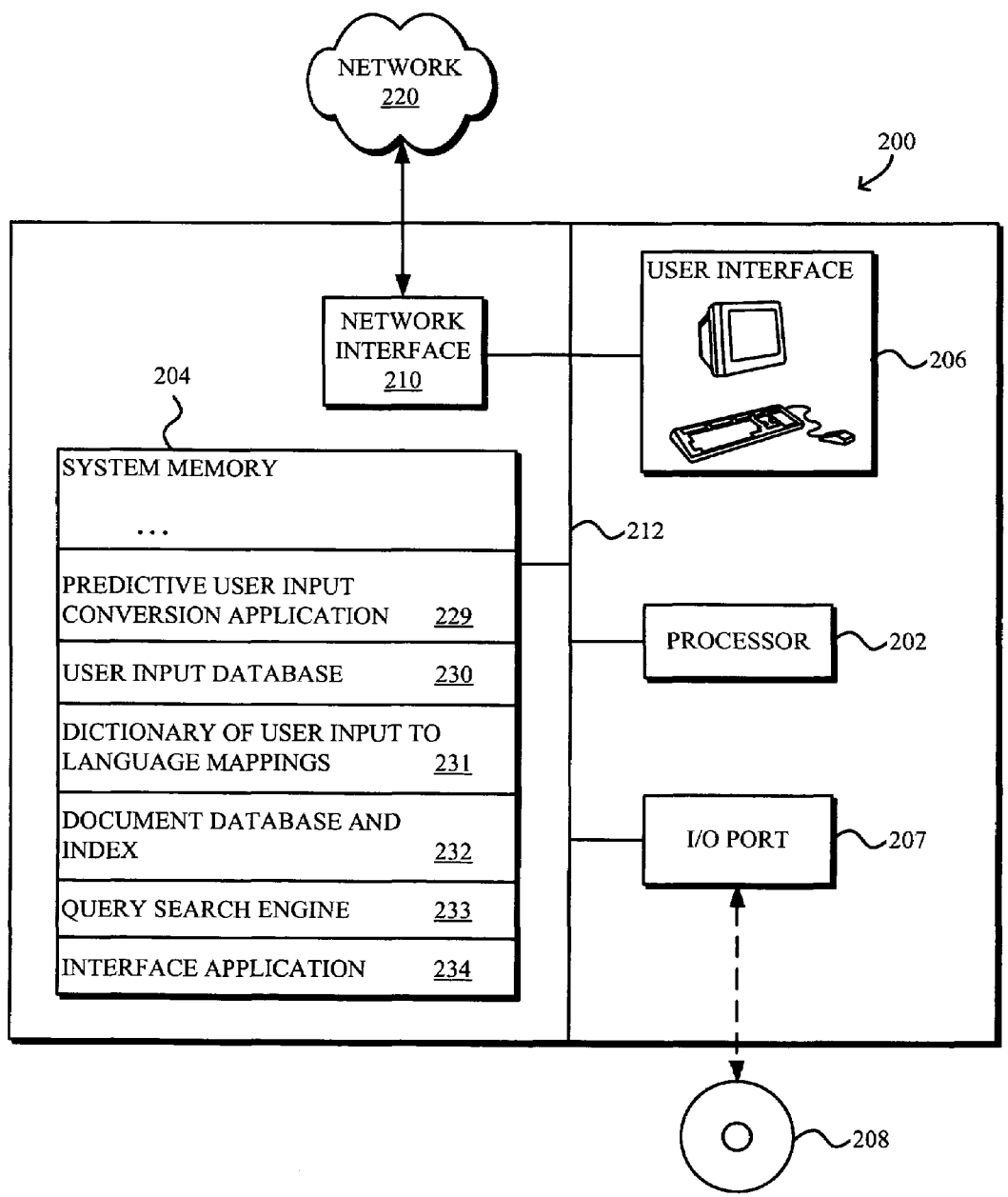
FIG. 2 is a block diagram of an illustrative computing system or device such as the client or server shown in FIG. 1, for implementing an exemplary predictive user input conversion system.

FIG. 2 is a block diagram of an illustrative computing system or device 200, such as the client 102 or server 104, 105 shown in FIG. 1, for implementing a predictive user input conversion system. In one embodiment, the system 200 includes a computing device such as a personal computer, laptop, mainframe, personal digital assistant, cellular telephone, and/or the like. The system 200 may typically include a processor 202, memory 204, a user interface 206, an input/output port 207 for accepting removable storage media 208, a network interface 210, and a bus 212 for connecting the aforementioned elements.

The operation of system 200 may typically be controlled by the processor 202 operating under the guidance of programs stored in memory 204. The memory 204 generally includes some combination of computer readable media, such as high-speed random-access memory (RAM) and non-volatile memory such as read-only memory (ROM), a magnetic disk, disk array, and/or tape array. The input/output port 207 may include a disk drive or memory slot for accepting computer-readable media such as floppy diskettes, CD-ROMs, DVDs, memory cards, magnetic tapes, or the like. The user interface 206 may, for example, include a keyboard, mouse, pen, or voice recognition mechanism for entering information, and one or more mechanisms such as a display, printer, speaker, and/or the like for presenting information to a user. The network interface 210 is typically operable to provide a connection between the system 200 and other systems (and/or networks 220) via a wired, wireless, optical, and/or other connection.

As described in more detail below, the system 200 may be configured to perform predictive conversions of user text inputs in one language or character set to another language or character set. These operations may typically be performed in response to processor 202 executing software instructions contained on a computer readable medium such as memory 204. The software instructions may be read into memory 204 from another computer-readable medium, such as data storage device 208, or from another device via communication interface 210 or I/O port 207. As shown in FIG. 2, the memory 204 may include a variety of programs or modules for controlling the operation of system 200 and performing the predictive conversion and optional search and retrieval techniques described in more detail below. For example, the memory 204 may include a predictive user input conversion application 229, a user input database 230, and a dictionary of source (non-target input) language to target language mappings 231. The dictionary of source language to target language mappings 231 facilitates the predictive conversion application 229 in converting partial user inputs in the non-target language or character set to the target language or character set.

If the system 200 is a server for a search engine, for example, such as the server 105 shown in FIG. 1, the memory 204 may further include a document database and a corresponding index 232. The document database 232 may be a web corpus and the user input database 230 may be a query log. The memory 204 may also include a query search engine 233 for searching the document database 232 based on a query received via the user interface 206 and/or a query received remotely from a user over network 220. As shown in FIG. 2, the memory 204 may also include one or more programs for predictively converting user query inputs using the techniques described in more detail below, and a user-interface application 234 for operating user interface 206 and/or for serving web pages to remote users over the network 220. Although FIG. 2 illustrates a system that is primarily software-based, it will be appreciated that in other embodiments special-purpose circuitry may be used in place of, or in combination with, software instructions to implement processes consistent with the present invention. Thus, the present invention is not limited to any specific combination of hardware and software.

It should be appreciated that the systems and methods of the present invention can be practiced with devices and/or architectures that lack some of the components shown in FIGS. 1 and 2 and/or that have other components that are not shown. Thus, it should be appreciated that FIGS. 1 and 2 are provided for purposes of illustration, and do not limit the scope of the invention. For example, it should be appreciated that while, for purposes of illustration, the system 200 is depicted as a single, general-purpose computing device such as a personal computer or a network server, in other embodiments the system 200 may include one or more such systems operating together using distributed computing techniques. In such embodiments, some or all of the components functionality depicted in FIG. 2 may be spread amongst multiple systems at multiple locations and/or operated by multiple parties. For example, a predictive user input conversion application 229 and its associated components including the user input database 230 and the dictionary of source (input) language to target language mappings 231 may be implemented on a system that is separate from the system on which the document database 232 is hosted. The predictive query conversion application 231 may, in some embodiments, be executed on the client, rather than the server. It will be readily apparent that many similar variations could be made to the illustrations shown in FIGS. 1 and 2 without departing from the principles of the present invention.

Figure 3:
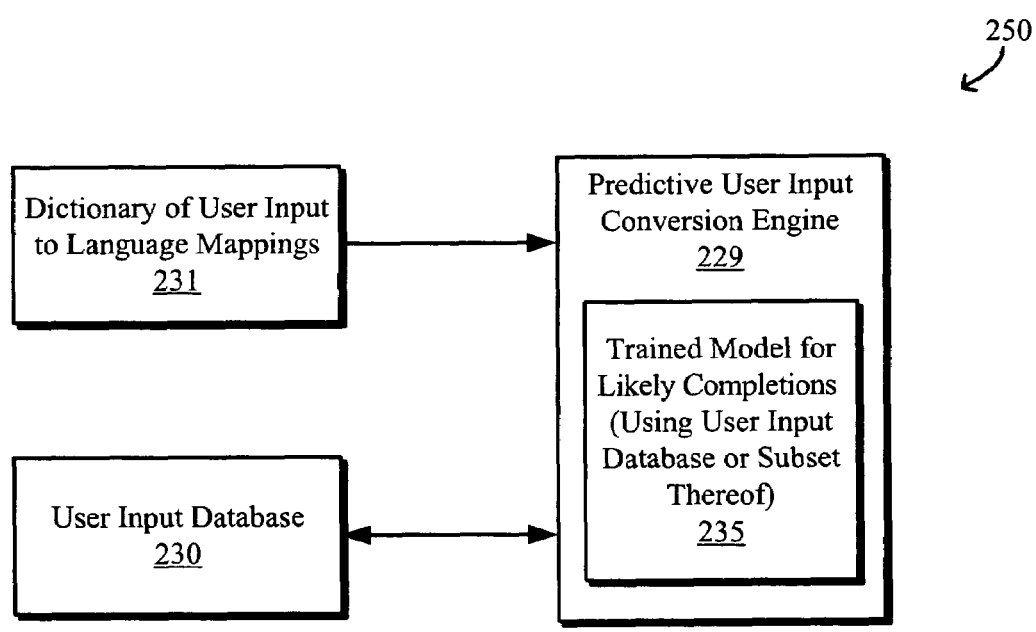
FIG. 3 is a block diagram illustrating the exemplary predictive user input conversion system in more detail.

As previously indicated, the systems shown in FIGS. 1 and 2 can be used to facilitate predictive conversion of partial user input. FIG. 3 is a block diagram illustrating a predictive user input conversion system 250. As shown, the predictive user input conversion system 250 includes the predictive user input conversion engine 229 in communication with the dictionary of source (non-target) language to target language mappings 231 and the user input database 230. The predictive user input conversion engine 229 may include a module for likely completions 235. In some implementations, the module for likely completions 235 may be a database of user inputs or a subset thereof. As another example, the module may be a model trained using, for example, the user input database 230 (e.g., a query log), or a subset thereof. The likely completions module 235 provides likely completed input strings in the target language or character set and their corresponding probabilities.

Figure 4:
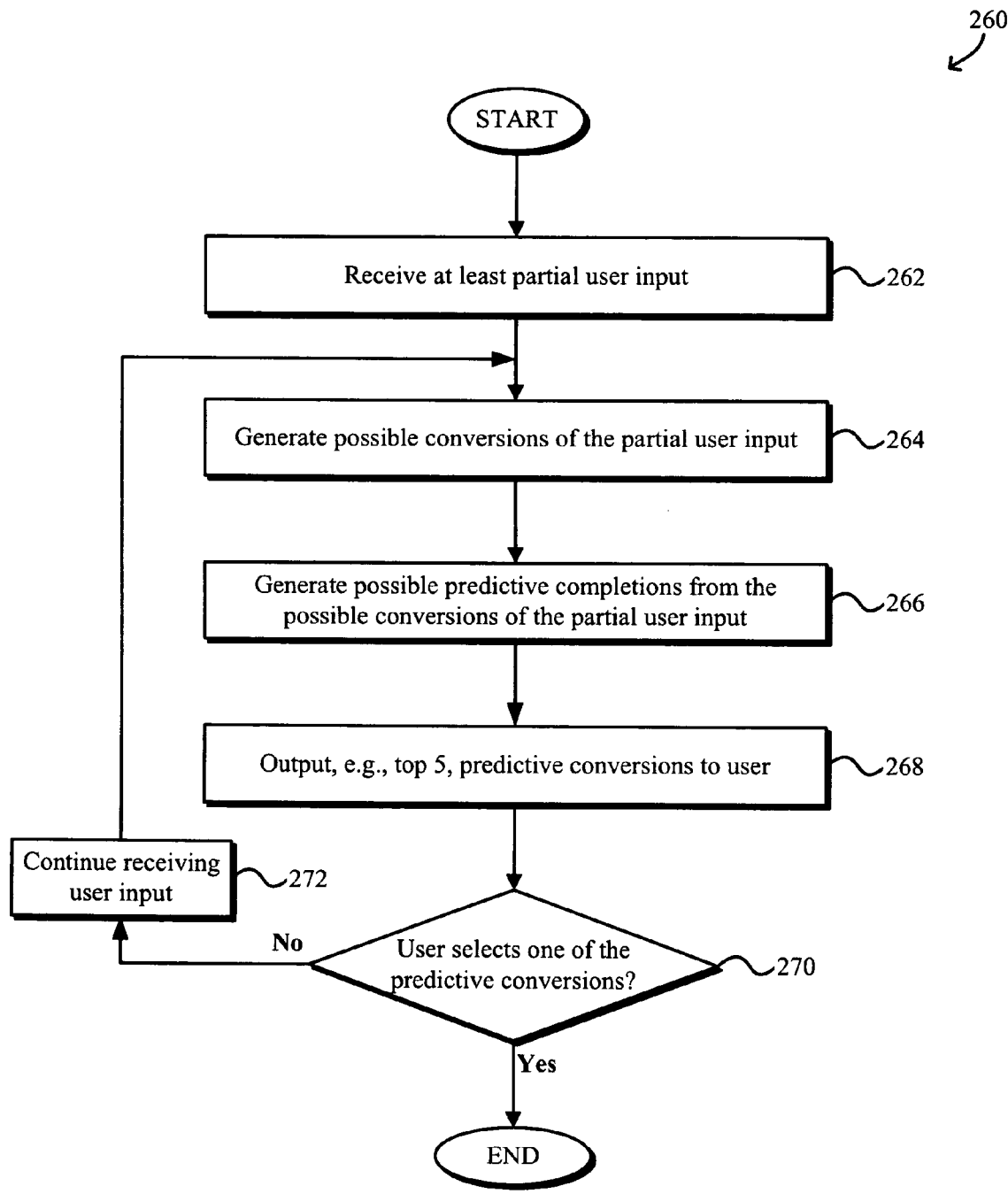
FIG. 4 is a flowchart illustrating an exemplary process for performing predictive user input conversion.

FIG. 4 is a flowchart illustrating a process 260 for performing predictive user input conversion. The process 260 may be repeated for a series of user inputs in a given session, e.g., for each character, word, or phrase in the target language or character set. At block 262, at least a partial user input, e.g., a prefix, in the non-target language or character set is received. As noted, the partial user input is in a first non-target language or character set, e.g., Roman or alphabetic characters, that is different from the target language or character set, e.g., Chinese characters. The predictive conversion engine may then attempt to perform the predictive conversion using the partial user input at blocks 264 and 266. Specifically, at block 264, the partial user input in the first non-target language or character set is used to generate possible conversions in the target language or character set. For example, the dictionary of the first non-target language or character set to the target language or character set mappings may be used in performing block 264. At block 266, possible completions of the possible conversions of the partial user input are generated. Note that at block 266, the predictive conversion engine generally also ranks the completed predictions based on the probabilities of the predictive conversions. The probabilities may be determined based on the database of user inputs, e.g., a query log, as will be described in more detail below. In particular, the likely completions module can be used in performing block 266.

In the example shown, the process first generates possible conversions of the partial user input to the target language or character set at block 264 and then generates possible completions of the converted partial user input at block 266. It is to be understood that block 266 may be performed prior to block 264. In particular, the process 260 may generate possible completions of the partial user input in the non-target language or character set at block 266 and convert the possible completions to the target language or character set at block 264. As yet another example, blocks 264 and 266 may be combined into a single integrated predictive conversion process. In particular, the process 260 may utilize an integrated predictive conversion data structure or database containing mappings of partial user inputs in the non-target language or character set to predictive conversion in the target language or character set. The database may also contain frequency or other statistical or probabilistic information for the mappings. In such a configuration, the dictionary of the non-target language or character set to the target language or character set mappings would be integrated in the predictive conversion database.

One or more parameters may be utilized to affect the operation of blocks 264 and 266 (or variations thereof as described above). For example, one parameter may indicate a preference for longer or shorter predictive completions. Each parameter may be set automatically by they system or process, set to a default value, and/or set by the user.

Note that the predictive conversion engine may, in some embodiments, interactively monitor the extent of the partial user input in block 262 as the user enters the input so that the predictive conversion engine may perform the predictive conversion when the user has entered a partial input that is sufficient to generate one or more predictive conversions. For example, where the user input is pinyin, the user may enter the pinyin for at least one Chinese character before the predictive conversion engine generates predictive conversions. The determination of when the user input is sufficient to generate meaningful and/or useful predictive conversions may be based on the particular user input and the probabilities of the possible conversions of the partial user input and/or of the possible completions of the possible conversions, for example.

Next, at block 268, one or more predictive conversions in the target language or character set are output to the user. In one embodiment, a set of top N (e.g., 5) predictive conversions based on the probabilities of the predictive conversions are output to the user. In another embodiment, only the predictive conversion with the highest probability is output to the user. The number of predictive conversions output to the user may be dynamically determined based on the probabilities of the predictive conversions. For example, the predictive conversion engine may be configured to output only the most likely predictive conversion if, for example, the most likely predictive conversion has a probability that is greater than a predetermined threshold and/or is greater than a predetermined multiple of the next likely predictive conversion. At decision block 270, if the user selects one of the predictive conversions output to the user, the selected predictive conversion may be adopted as the user's desired conversion and the process for predictive user input conversion 260 is complete. However, if the user does not make a selection from the predictive conversions output in block 268 as determined at decision block 270, then the process 260 continues to receive further user input at block 272 so that additional user input can be used by the predictive user input conversion engine to perform the predictive conversion. The process 260 then returns to block 264 to perform the predictive conversion using the additional user input.

As noted above, the probabilities of predictive conversions may be computed by the predictive conversion engine using the likely completions module. In some embodiments, the module for likely completions may be manually generated or otherwise predetermined. More typically, the likely completions module may be a likely completions model trained using a database of user inputs and corresponding completed conversions. The database for likely completions may be tailored as appropriate for the application and/or user. For example, for a user entering text into a search engine, the probabilities of the predictive conversions may be computed using query logs for all users, or query logs for users in a same or similar geographic location and/or a same or similar time period. As another example, the predictive conversion engine may be personalized by using only the user's own inputs or searches, e.g., the user's current search session or the user's past search sessions.

Figure 5:
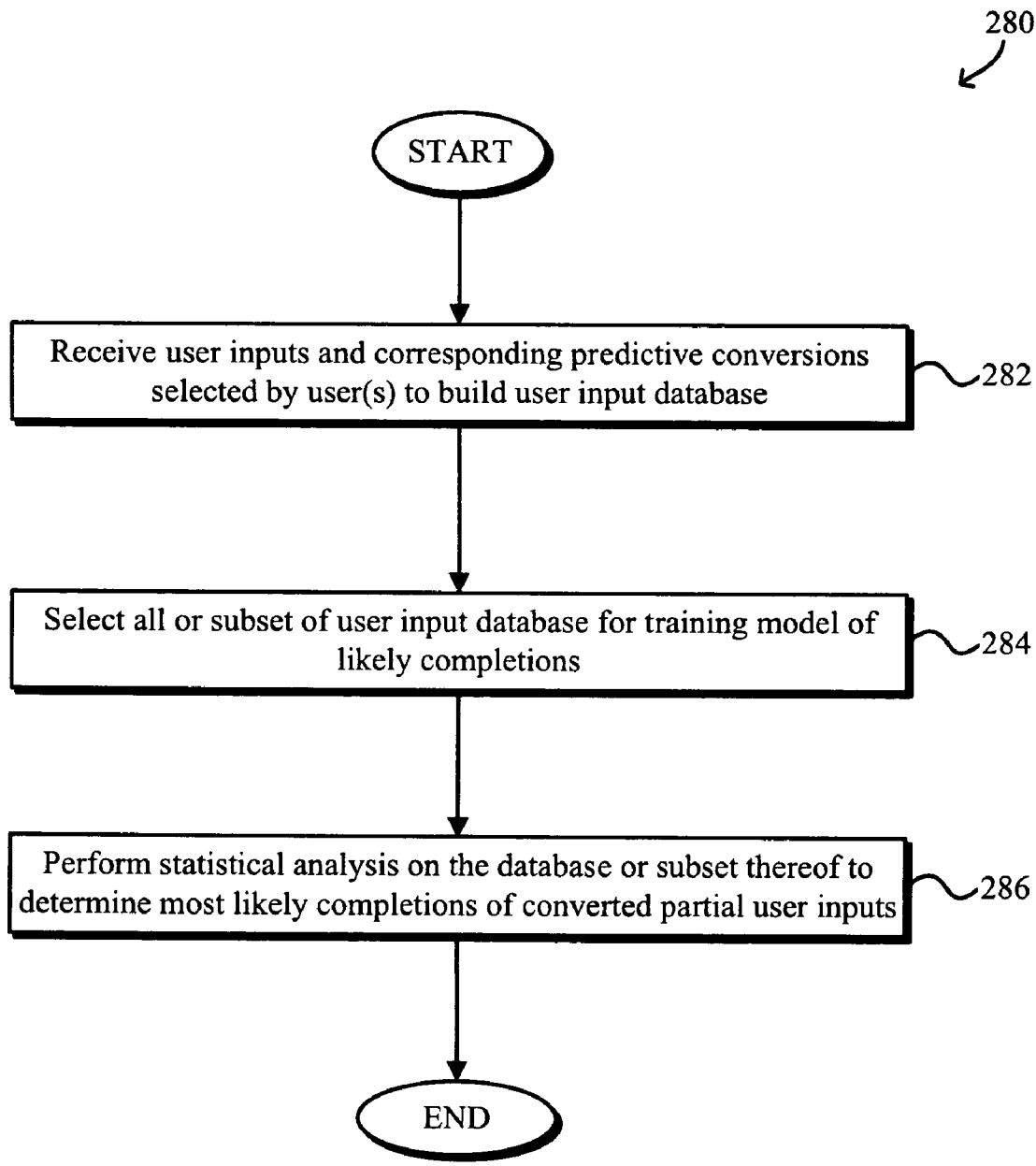
FIG. 5 is a flowchart illustrating an exemplary process for training a likely completions module for the predictive user input converter.

FIG. 5 is a flowchart illustrating an exemplary process 280 for generating a module of likely completions for the predictive user input converter. At block 282, a log of user inputs in the target language or character set may be maintained to build the user input database. As noted, the user input database may be query or search logs associated with a search engine. The database facilitates determining the likelihood of the predicted completed conversions. At block 284, the user database or a subset thereof may be used to generate the likely completions module. In particular, a subset of the user database may be selected in order to generate a module with particular characteristics, e.g., to tailor the module as appropriate for the application and/or the user. For example, a subset of the user database may be selected based on inputs collected from a particular time period, from users in particular geographic location, from the same user, from the same user in the particular session, and/or various other suitable criteria. At block 286, a module of likely input strings and likely completions (e.g., searches) is generated by performing statistical analysis on the database or subset thereof as selected in block 284. The process for training the likely completions module may be performed periodically as the database is updated and/or may be repeated to generate various models so as to tailor each model as appropriate for the application and/or the user.

As noted, the predictive conversion engine may be integrated into a search engine. The integration may be achieved in various ways. For example, the predictive conversion engine may be implemented as part of the search engine server so that a user only enters a prefix or other partial query, e.g., in roman representation, and the server converts the partial query to the target language or character set and generates one or more likely completions of the conversion (or, as noted above, generates likely completions of the partial query and converts the likely completions to the target language or character set). The server may then return a list of the most likely completed conversions, e.g., a list of the 5 or 10 most likely completed conversions, from which the user may select to perform the search. Alternatively or additionally, the server may perform the search based on the most likely completed conversion and return the search results to the user.

Instead of providing the predictive conversion engine on the server side, the predictive conversion engine may be similarly implemented on the client side such as in the user's client program, e.g. in a toolbar for the interface application such as a web browser. In such a configuration, the user may begin entering a partial input, such as a query in roman letters, and the client side predictive conversion engine may monitor the user's input and predictively compute one or more possible completed conversions when the user has provided a sufficient amount of information. Alternatively, the user may enter the input and manually or otherwise cause the predictive conversion engine to predictively compute one or more possible completed conversions. The output may be provided, for example, in a pop-up window or a drop-down list from which the user may select one of the possible completed conversions.

As is evident, the predictive conversion engine or system, either installed on a server side or a client side, facilitates user input by allowing the user to enter only a partial representation of the desired input in the non-target language. In other words, the user only needs to enter a starting sequence, prefix, or other partial representation of the desired input in the non-target language and the predictive conversion system performs the conversion to the target language as well as the predictive completion of the converted partial input.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A computer-implemented method for predictively converting a partial user input, comprising:
   receiving a partial user input from a user, the partial user input being Roman characters;
   converting the partial user input of Roman characters to a converted partial user input, the converted partial user input being first non-Roman characters that are represented by the user input of Roman characters;
   generating possible completions from the converted partial user input of non-Roman characters, each possible completion including the first non-Roman characters and second non-Roman characters, the first non-Roman characters being a prefix to the second non-Roman characters, and the second non-Roman characters being non-Roman characters that are not represented by the partial user input;
   outputting one or more of the possible completions.

2. The computer-implemented method of claim 1, wherein the converting is based on a statistical mapping of user inputs in Roman characters to converted inputs in non-Roman characters.

3. The computer-implemented method of claim 1, wherein the converting is based on a database of user inputs in Roman characters to converted inputs in non-Roman characters.

4. The computer-implemented method of claim 3, wherein the converting includes performing statistical analysis on at least a portion of the user inputs in the database to determine likely completions of the partial user inputs.

5. The computer-implemented method of claim 3, wherein the converting is based on a subset of the user inputs in the database, the subset of the user inputs being associated with at least one of: a geographic location, a time period, and the user from whom the partial user input is received.

6. The computer-implemented method of claim 1, wherein the partial user input represents a partial user query to a search engine.

7. The computer-implemented method of claim 1, wherein the partial user input is a pinyin input, and the possible completions comprises Chinese characters.

8. The computer-implemented method of claim 1, wherein the partial user input corresponds to a prefix of the possible completion, the prefix being the first non-Roman characters.

9. computer program product for use in conjunction with a computer system, the computer program product comprising a computer readable storage medium on which are stored instructions executable on a computer processor, and upon such execution cause the computer processor to perform operations comprising:
   receiving a partial user input, the partial user input being Roman characters;
   converting the partial user input of Roman characters to a converted partial user input, the converted partial user input being first non-Roman characters that are represented by the user input of Roman characters:
   generating possible completions from the converted partial user input of non-Roman characters, each possible completion including the first non-Roman characters and second non-Roman characters, the first non-Roman characters being a prefix to the second non-Roman characters, and the second non-Roman characters being non-Roman characters that are not represented by the partial user input; and
   outputting one or more of the possible completions.

10. The computer program product of claim 9, wherein the converting is based on a statistical mapping of user inputs in Roman characters to converted inputs in non-Roman characters.

11. The computer program product of claim 9, wherein the partial user input represents a partial user query to a search engine.

12. A computer-implemented method, comprising:
   receiving a partial user input of Roman characters in a first language, the partial user input defining one or more Pinyin syllables;
   converting the partial user input to a converted partial user input of one or more non-Roman characters in the second language, the one or more non-Roman characters being first Chinese characters that are represented by the one or more Pinyin syllables;
   generating a converted completion of the partial user input from the converted partial user input, the converted completion being non-Roman characters in the second language and including the first Chinese characters and second Chinese characters, the first Chinese characters being a prefix to the second Chinese characters, and the second Chinese characters not being represented by the one or more Pinyin syllables; and
   outputting the converted completion to a user device.

* * * * *

UNITED STATES PATENT AND TRADEMARK OFFICE
CERTIFICATE OF CORRECTION

PATENT NO.         : 7,506,254 B2                                    Page 1 of 1
APPLICATION NO. : 11/111583
DATED              : March 17, 2009
INVENTOR(S)        : Alexander Mark Franz It is certified that error appears in the above-identified patent and that said Letters Patent is hereby corrected as shown below:

In Column 10, Claim 9, Line 1, before "computer" insert -- A --.

In Column 10, Claim 9, Line 12, delete ":" and insert -- ; --.

Signed and Sealed this

Twelfth Day of May, 2009

JOHN DOLL
*Acting Director of the United States Patent and Trademark Office*